(12) United States Patent
Watanabe

(10) Patent No.: US 10,514,550 B2
(45) Date of Patent: Dec. 24, 2019

(54) HOLOGRAM IMAGE DISPLAY APPARATUS

(71) Applicant: OLYMPUS CORPORATION, Hachioji-shi, Tokyo (JP)

(72) Inventor: Daichi Watanabe, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 255 days.

(21) Appl. No.: 15/484,737

(22) Filed: Apr. 11, 2017

(65) Prior Publication Data
US 2017/0220001 A1   Aug. 3, 2017

Related U.S. Application Data

(63) Continuation of application No. PCT/JP2014/005409, filed on Oct. 24, 2014.

(51) Int. Cl.
| | | |
|---|---|---|
| *G02B 27/10* | (2006.01) | |
| *G02B 26/08* | (2006.01) | |
| *G02B 27/00* | (2006.01) | |
| *G02B 27/42* | (2006.01) | |

(52) U.S. Cl.
CPC ......... *G02B 27/1026* (2013.01); *G02B 26/08* (2013.01); *G02B 26/0808* (2013.01); *G02B 27/0056* (2013.01); *G02B 27/42* (2013.01)

(58) Field of Classification Search
CPC .................. G03H 1/2294; G03H 22/02; G03H 2001/2239
See application file for complete search history.

(56) References Cited

FOREIGN PATENT DOCUMENTS

| | | |
|---|---|---|
| JP | 2000250387 A | 9/2000 |
| JP | 2003173128 A | 6/2003 |

OTHER PUBLICATIONS

Gang Li,Viewing zone enlargement of holographic display using high order terms guided by holographic optical element (Year: 2015).*
Viewing zone enlargement of holographic display using high order terms guided by holographic optical element (Year: 2015).*
International Search Report (ISR) and Written Opinion dated Jan. 13, 2015 issued in International Application No. PCT/JP2014/005409.

(Continued)

*Primary Examiner* — Darryl J Collins
*Assistant Examiner* — Journey F Sumlar
(74) *Attorney, Agent, or Firm* — Holtz, Holtz & Volek PC

(57) ABSTRACT

A hologram image display apparatus includes an illumination optical system that emits an illumination light beam wavefront and a spatial light modulator having a light modulation area that converts the illumination light beam wavefront by diffraction to a display light beam wavefront and displays a virtual image. The spatial light modulator forms the display light beam wavefront by modulating the illumination light beam wavefront so that at least a portion of a regular light ray group configuring the display light beam wavefront is a light ray group with a diffraction angle having an absolute value greater than the ±first-order diffraction angle by the spatial light modulator, and another portion of the regular light ray group is a light ray group with a diffraction angle having an absolute value of the ±first-order diffraction angle or less by the spatial light modulator.

11 Claims, 20 Drawing Sheets

(56) References Cited

OTHER PUBLICATIONS

Tomoyuki Mishina, et al., "Enlargement of viewing zone for CGH (computer-generated holography) using sampled hologram," ITE Technical Report, Sep. 1, 2000, vol. 24, No. 47, pp. 29-34.

Tomoyuki Mishina, et al., "Enlargement of Viewing Zone using High-Order Diffraction Beams Generated from Spatial Light Modulator with a Pixel Structure," The Journal of the Institute of Image Information and Television Engineers, May 20, 2001, vol. 55, No. 5, pp. 688-695.

Senoh Takanori, et al., "Viewing-Zone-Angle Expansion of Electronic Holography Reconstruction System," Review of the National Institute of Information and Communications Technology, 2010, vol. 56, Nos. 1/2, pp. 31-42.

* cited by examiner

| (-2,3) | (-1,3) | (1,3) | (2,3) |
| --- | --- | --- | --- |
| (-2,2) | (-1,2) | (1,2) | (2,2) |
| (-2,1) | (-1,1) | (1,1) | (2,1) |
| (-2,-1) | (-1,-1) | (1,-1) | (2,-1) |
| (-2,-2) | (-1,-2) | (1,-2) | (2,-2) |
| (-2,-3) | (-1,-3) | (1,-3) | (2,-3) |

| (-2,3) | (-1,3) | (-1,3) | (1,3) | (1,3) | (2,3) |
|---|---|---|---|---|---|
| (-2,2) | (-1,2) | (-1,2) | (1,2) | (1,2) | (2,2) |
| (-2,2) | (-1,2) | (-1,2) | (1,2) | (1,2) | (2,2) |
| (-2,1) | (-1,1) | (-1,1) | (1,1) | (1,1) | (2,1) |
| (-2,1) | (-1,1) | (-1,1) | (1,1) | (1,1) | (2,1) |
| (-2,-1) | (-1,-1) | (-1,-1) | (1,-1) | (1,-1) | (2,-1) |
| (-2,-1) | (-1,-1) | (-1,-1) | (1,-1) | (1,-1) | (2,-1) |
| (-2,-2) | (-1,-2) | (-1,-2) | (1,-2) | (1,-2) | (2,-2) |
| (-2,-2) | (-1,-2) | (-1,-2) | (1,-2) | (1,-2) | (2,-2) |
| (-2,-3) | (-1,-3) | (-1,-3) | (1,-3) | (1,-3) | (2,-3) |

FIG. 15

| | | |
|---|---|---|
| [-1,2] | [0,2] | [1,2] |
| [-1,1] | [0,1] | [1,1] |
| [-1,0] | [0,0] | [1,0] |
| [-1,-1] | [0,-1] | [1,-1] |
| [-1,-2] | [0,-2] | [1,-2] |

FIG. 16

| | | |
|---|---|---|
| [1,-2] | [0,-2] | [-1,-2] |
| [1,-1] | [0,-1] | [-1,-1] |
| [1,0] | [0,0] | [-1,0] |
| [1,1] | [0,1] | [-1,1] |
| [1,2] | [0,2] | [-1,2] |

| (1,-2) | (2,-2) | (-1,-2) | (1,-2) | (-2,-2) | (-1,-2) |
|---|---|---|---|---|---|
| (1,-3) | (2,-3) | (-1,-3) | (1,-3) | (-2,-3) | (-1,-3) |
| (1,-1) | (2,-1) | (-1,-1) | (1,-1) | (-2,-1) | (-1,-1) |
| (1,-2) | (2,-2) | (-1,-2) | (1,-2) | (-2,-2) | (-1,-2) |
| (1,1) | (2,1) | (-1,1) | (1,1) | (-2,1) | (-1,1) |
| (1,-1) | (2,-1 | (-1,-1) | (1,-1) | (-2,-1) | (-1,-1) |
| (1,2) | (2,2) | (-1,2) | (1,2) | (-2,2) | (-1,2) |
| (1,1) | (2,1) | (-1,1) | (1,1) | (-2,1) | (-1,1) |
| (1,3) | (2,3) | (-1,3) | (1,3) | (-2,3) | (-1,3) |
| (1,2) | (2,2) | (-1,2) | (1,2) | (-2,2) | (-1,2) |

FIG. 21

|  | Column 1 | | Column 0 | | Column -1 | |
|---|---|---|---|---|---|---|
| Row 2 | (1,-2) | (2,-2) | (-1,-2) | (1,-2) | (-2,-2) | (-1,-2) |
|  | (1,-3) | (2,-3) | (-1,-3) | (1,-3) | (-2,-3) | (-1,-3) |
| Row 1 | (1,-1) | (2,-1) | (-1,-1) | (1,-1) | (-2,-1) | (-1,-1) |
|  | (1,-2) | (2,-2) | (-1,-2) | (1,-2) | (-2,-2) | (-1,-2) |
| Row 0 | (1,1) | (2,1) | (-1,1) | (1,1) | (-2,1) | (-1,1) |
|  | (1,-1) | (2,-1) | (-1,-1) | (1,-1) | (-2,-1) | (-1,-1) |
| Row -1 | (1,2) | (2,2) | (-1,2) | (1,2) | (-2,2) | (-1,2) |
|  | (1,1) | (2,1) | (-1,1) | (1,1) | (-2,1) | (-1,1) |
| Row -2 | (1,3) | (2,3) | (-1,3) | (1,3) | (-2,3) | (-1,3) |
|  | (1,2) | (2,2) | (-1,2) | (1,2) | (-2,2) | (-1,2) |

FIG. 22

| (2,-2) | (1,-2) | (-1,-2) | (1,-2) | (-1,-2) | (-2,-2) |
|---|---|---|---|---|---|
| (2,-3) | (1,-3) | (-1,-3) | (1,-3) | (-1,-3) | (-2,-3) |
| (2,-2) | (1,-2) | (-1,-2) | (1,-2) | (-1,-2) | (-2,-2) |
| (2,-1) | (1,-1) | (-1,-1) | (1,-1) | (-1,-1) | (-2,-1) |
| (2,1) | (1,1) | (-1,1) | (1,1) | (-1,1) | (-2,1) |
| (2,-1) | (1,-1) | (-1,-1) | (1,-1) | (-1,-1) | (-2,-1) |
| (2,1) | (1,1) | (-1,1) | (1,1) | (-1,1) | (-2,1) |
| (2,2) | (1,2) | (-1,2) | (1,2) | (-1,2) | (-2,2) |
| (2,3) | (1,3) | (-1,3) | (1,3) | (-1,3) | (-2,3) |
| (2,2) | (1,2) | (-1,2) | (1,2) | (-1,2) | (-2,2) |

Number of phase modulation devices
- 2232
- 3438
- 2232

- 2259
- 2232
- 3438
- 2232
- 2259

HOLOGRAM IMAGE DISPLAY APPARATUS

CROSS-REFERENCE TO RELATED APPLICATION

The present application is a Continuing Application based on International Application PCT/JP2014/005409 filed on Oct. 24, 2014, the entire disclosure of which is incorporated herein by reference.

TECHNICAL FIELD

The present disclosure relates to a hologram image display apparatus.

BACKGROUND

A hologram display apparatus forms a hologram pattern on a spatial light modulator, and by irradiating an illumination light beam on the spatial light modulator, forms an optical wavefront of an object to be displayed, thereby displaying a three-dimensional image within an observer's field of view. In general, letting the angle formed between the incident light and the exiting light with respect to the hologram be θ, a hologram image can be formed by a wavefront that includes a light ray group satisfying the following relationship:

$$\theta < \arcsin(\lambda/2p) \quad (1)$$

(where λ is the wavelength of the light source, and p is the light modulation device pitch of the hologram).

Here, the spatial light modulator is a device in which numerous minute light modulation devices are arranged two-dimensionally. The spatial light modulator modulates the phase, intensity, and the like of light that passes through or is reflected by the light modulation devices. Examples of spatial light modulators used for generating a hologram pattern include a spatial light intensity modulator that modulates the spatial intensity distribution of the optical wavefront of an illumination light beam and a spatial light phase modulator (also referred to below as a phase modulator) that modulates the spatial phase distribution of the optical wavefront of an illumination light beam.

From Equation (1), the display angle of view of an observable hologram image is 2θ, i.e. the range from −θ to θ. By reducing the light modulation device pitch p of the hologram, the display angle of view 2θ can be increased. With current techniques, however, it is difficult to reduce the light modulation device pitch of a light modulator beyond a certain amount. The display angle of view 2θ is thus restricted to a narrow range. Therefore, achieving a wide display angle of view is a practical challenge for hologram image display apparatuses.

On the other hand, it has been proposed to use a plurality of plane waves with different angles of incidence relative to the hologram in order to reproduce a hologram image with a display angle of view greater than 2θ relative to the hologram plane while satisfying relational expression (1) (for example, see NPL 1).

CITATION LIST

Non-Patent Literature

NPL 1: SENOH Takanori et al., "Viewing-Zone-Angle Expansion of Electronic Holography Reconstruction System," Review of the National Institute of Information and Communications Technology, 2010, Vol. 56 Nos. 1/2, pp. 31-42

SUMMARY

A hologram image display apparatus according to the present disclosure comprises:

an illumination optical system configured to emit an illumination light beam wavefront; and a spatial light modulator having a light modulation area that converts the illumination light beam wavefront by diffraction to a display light beam wavefront and displays a virtual image;

wherein the spatial light modulator forms the display light beam wavefront by modulating the illumination light beam wavefront so that at least a portion of a regular light ray group configuring the display light beam wavefront is a light ray group with a diffraction angle having an absolute value greater than a ±first-order diffraction angle by the spatial light modulator, and another portion of the regular light ray group is a light ray group with a diffraction angle having an absolute value of a ±first-order diffraction angle or less by the spatial light modulator and wherein one direction in the light modulation area of the spatial light modulator is an x-direction and another direction intersecting the x-direction is a y-direction, and based on a range of diffraction angles, in the x-direction and the y-direction, of the regular light ray group configuring the display light beam wavefront, the light modulation area is formed by a plurality of unit areas divided in the x-direction and the y-direction, a range of the diffraction angle of the regular light ray group allocated to each of the plurality of unit areas is prescribed to be a range between two diffraction angles of different orders in the x-direction and the y-direction, and combinations of the orders differ from each other.

An $m^{th}$-order diffraction angle may be represented by $$\theta_m = \arcsin(m \times \lambda/2p) \quad (2)$$

where λ is a wavelength of the illumination light beam, p is a device pitch of the spatial light modulator, and m is an order of diffraction.

Furthermore, the hologram image display apparatus may further comprise a spatial light modulator controller configured to control the spatial light modulator so as to form a spatial area in which, from each unit area, only the regular light ray group emitted in a range of the diffraction angles allocated to the unit area exists.

Within the light modulation area, a unit area that projects a regular first virtual image with only light of a diffraction angle in a range of a negative first-order diffraction angle or greater to a first-order diffraction angle or less in both the x-direction and the y-direction may be a {0, 0} area, a unit area adjacent to the {0, 0} area in the x-direction may be an area that projects a regular second virtual image by diffracted light of a zero-order diffraction angle or greater to the first-order diffraction angle or less and light with a diffraction angle in a range of greater than the first-order diffraction angle to a second-order diffraction angle or less, the second virtual image may be divided in two in the x-direction and switched in the x-direction with respect to an image that would be reproduced when projected at a diffraction angle in a range of the negative first-order diffraction angle or greater to a first-order diffraction angle or less, a unit area adjacent to the {0, 0} area in the y-direction may be an area that projects a regular third virtual image by diffracted light of the zero-order diffraction angle or greater to the first-order diffraction angle or less and diffracted light of greater than the first-order diffraction angle to the second-order diffraction angle or less, and the third virtual image may be divided in two in the y-direction and switched in the y-direction with respect to an image that would be reproduced when projected at a diffraction angle in a range of the negative first-order diffraction angle or greater to the first-order diffraction angle or less.

Furthermore, the hologram image display apparatus may further comprise a pupil position detection mechanism configured to detect a pupil position of an eyeball of an observer three-dimensionally, a hologram image being formed on a retina of the eyeball;

wherein the hologram image display apparatus calculates boundaries of the unit areas of the spatial light modulator in conjunction with the pupil position and calculates hologram data for each unit area for an image to be reproduced, and the spatial light modulator forms the display light beam wavefront based on the hologram data.

BRIEF DESCRIPTION OF THE DRAWINGS

In the accompanying drawings:

FIG. 15 illustrates a first-order image by units;

FIG. 16 illustrates a method for generating a second-order image from a first-order image;

FIG. 21 illustrates switching rows and columns during generation of a third-order image;

FIG. 22 illustrates the divided areas of each unit in a third-order image;

DETAILED DESCRIPTION

Before describing embodiments of the present disclosure, the technical matter serving as the foundation for the present disclosure is described with reference to the drawings.

Figure 1:
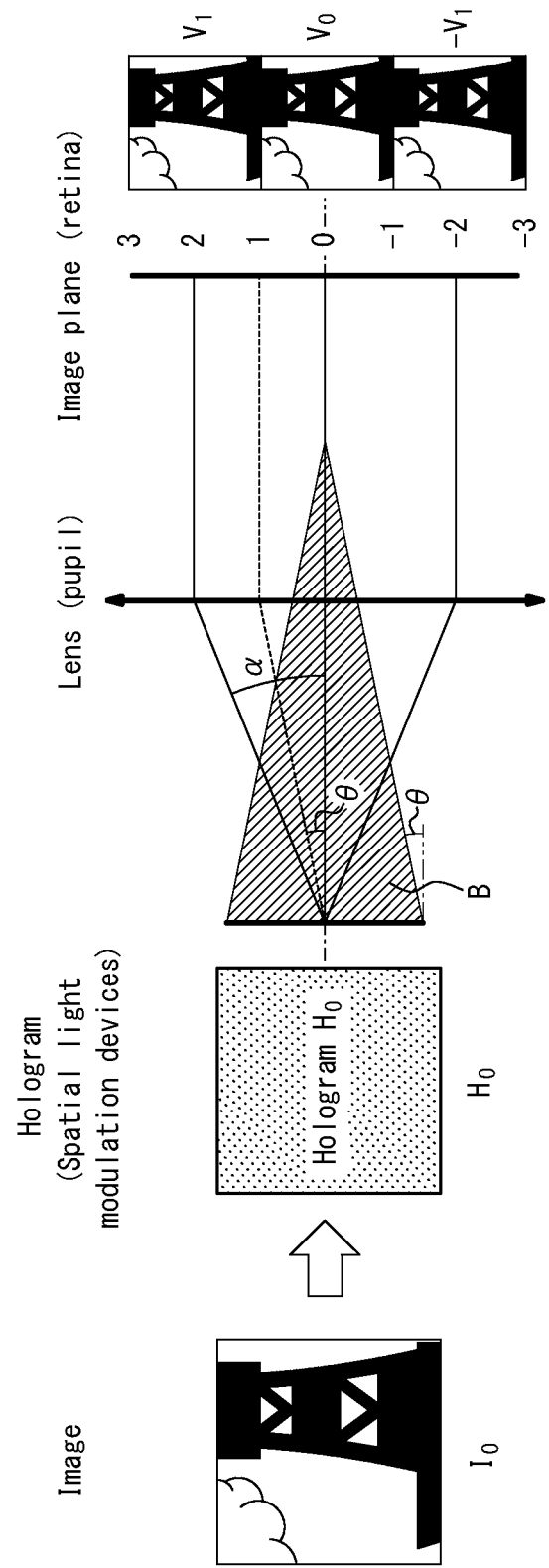
FIG. 1 illustrates image display by a hologram with a conventional technique.

FIG. 1 illustrates image display by a hologram with a conventional technique. With respect to an original image $I_0$ to be displayed, a hologram $H_0$ that indicates the modulation amount of each light modulation device in the spatial light modulator is calculated. By diffraction of illumination light by the light modulation devices, the hologram $H_0$ forms the wavefront of light that would be diffused from the image $I_0$ if the original image $I_0$ were to exist. The hologram $H_0$ can be calculated by a computer based on the original image $I_0$ using the known Gerchberg-Saxton (GS) algorithm or the like. It is known that relative to the modulation device pitch p of the light modulation devices and the wavelength λ of illumination light, the display angle of view of a displayable image is within a range of ±first-order diffraction angle $\theta_{\pm 1}$. The diffraction angle of $m^{th}$-order diffracted light is given by Expression (2) described above.

Therefore, the following holds.

$$\theta_{\pm 1} = \arcsin(\pm \lambda / 2p) \qquad (3)$$

When $\theta_{+1}$ is θ, then $\theta_{-1} = \theta_{+1}$. Hence, the display angle of view is a range of 2θ.

The case, as in FIG. 1, of using a lens (represented by the double-headed arrow in FIG. 1) and projecting a display light beam modulated by the hologram $H_0$ onto an image plane is considered. Here, the lens is the cornea of the observer's eye or is a crystal lens, and the image plane is the retina. On the image plane, for example a virtual image $V_0$ of the original image $I_0$ is reproduced by a display light beam having an angle of the negative first-order diffraction angle or greater to the positive first-order diffraction angle or less. Furthermore, in areas adjacent to the virtual image $V_0$, virtual images $V_1$, $V_{-1}$, etc. of the same original image $I_0$ are repeatedly displayed spatially. Accordingly, a hologram image exceeding the range of the display angle of view of 2θ cannot be displayed with a conventional technique. In FIG. 1, the hologram is formed over the entire light modulation area of the spatial light modulator. The observer can see the entire hologram image no matter where the observer places the pupil in the range represented by shading. The area in which the observer can thus place the eye to see the entire hologram image is referred to as the eye box. The numbers to the side of the image plane in FIG. 1 indicate the order of the diffracted light reaching that position. The angle α indicates the diffraction angle of second-order diffracted light and is an angle satisfying the following expression.

$$\alpha = \arcsin(\lambda / p) \qquad (4)$$

Furthermore, the image projected onto the image plane by the lens is normally inverted, but in the drawings and the specification of the present application, the vertical inversion of the image is disregarded for ease of explanation. The explanation in the present application still holds, however, even when the image on the image plane is inverted.

Figure 2:
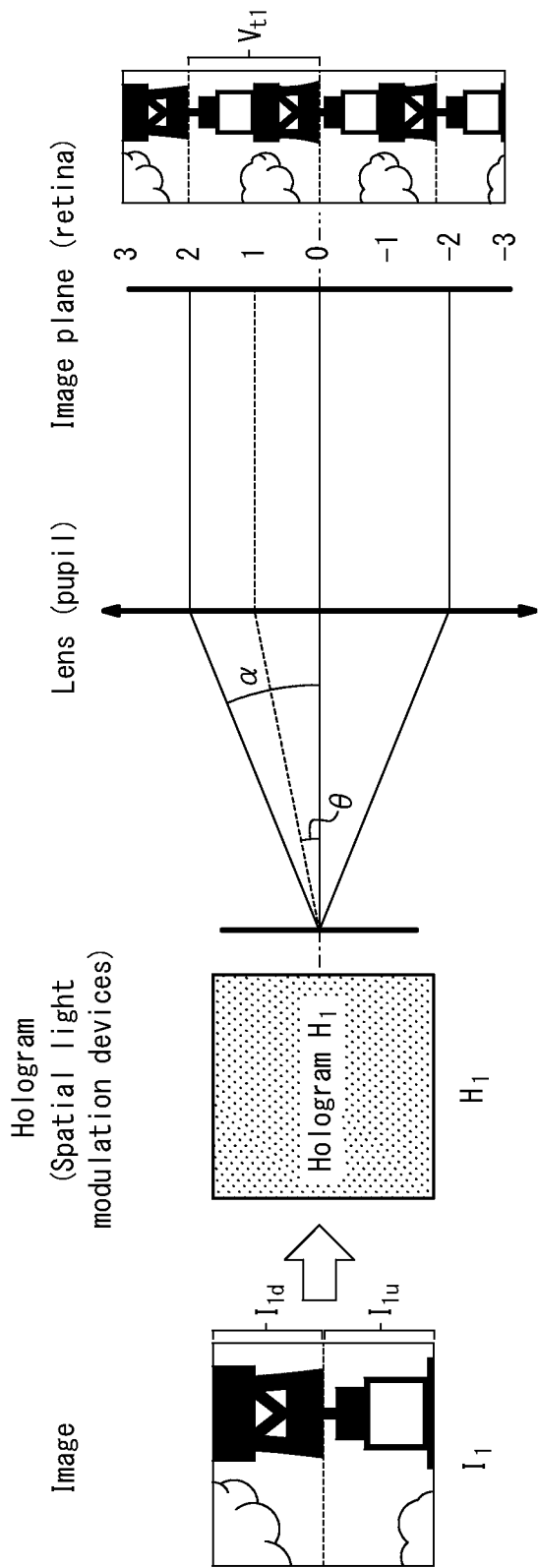
FIG. 2 illustrates image display by a hologram based on an image yielded by dividing the original image into upper and lower portions and reversing the portions.

Next, FIG. 2 illustrates image display by a hologram based on an image yielded by dividing the original image into upper and lower portions and switching the upper and lower portions of the image. The original image $I_1$ in FIG. 2 is formed by an image divided in two. The upper image $I_{1u}$ that was positioned at the upper side and the lower image $I_{1d}$ that was positioned at the lower side in the original image are vertically switched. The lower image $I_{1d}$ is the same image as the upper half of the original image $I_0$ in FIG. 1.

Upon projecting this original image $I_1$ onto the image plane as a hologram, the repeated original image $I_1$ appears as in FIG. 1. Here, focusing on the virtual image $V_{t1}$ as one cohesive image in the image displayed on the image plane, an image generated by diffracted light of a diffraction angle in a range of the zero-order diffraction angle or greater to the first-order diffraction angle or less and an image generated by diffracted light of a diffraction angle in a range of greater than the first-order diffraction angle to the second-order diffraction angle or less are combined. The upper image $I_{1u}$ is thus displayed on top of the lower image $I_{1d}$ to project these images as though they were one image before being vertically switched.

Figure 3:
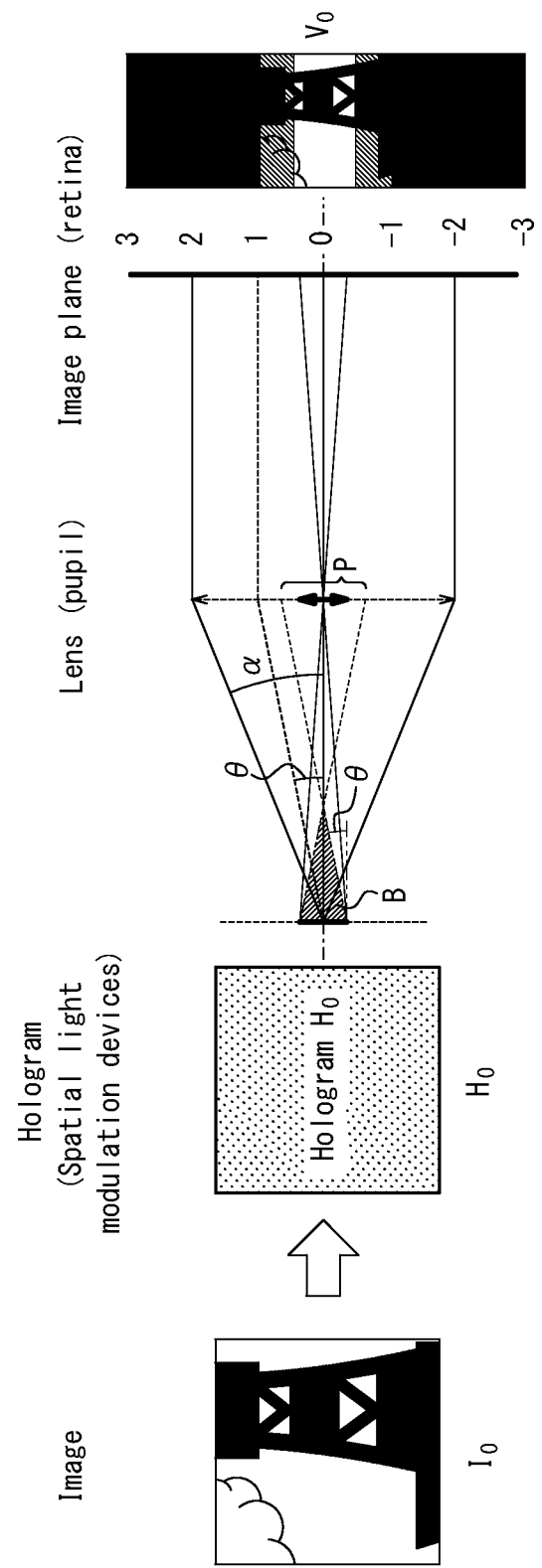
FIG. 3 illustrates image display by a hologram based on the image in FIG. 1 after adjusting the size and direction relative to a human pupil.

FIG. 3 illustrates a hologram image display of the same image as in FIG. 1 after adjusting the size and direction relative to the lens diameter, i.e. to a human pupil. In this case, unlike the case in FIG. 1, the displayed area of the hologram is restricted in correspondence with the magnitude of the pupil of a human eye (approximately 3 mm to 4 mm in a normal environment). In other words, the setting of the size of the hologram, the direction, and the distance from the lens is considered so that only light rays with a diffraction angle of the negative first-order diffraction angle or greater to the first-order diffraction angle or less pass through the lens.

Specifically, the hologram $H_0$ is disposed in a predetermined range centering on the position where a perpendicular from the center of the lens (the center of the pupil) intersects the light modulation area of the spatial light modulator. As a result, as illustrated in FIG. 3, what arrives at the image plane is a light ray group with a diffraction angle having an absolute value of the ±first-order diffraction angle or less. In other words, the image formed on the image plane of FIG. 3 is the portion yielded by blocking, within the image of FIG. 1, the light ray group with a diffraction angle greater than the first-order diffraction angle and the light ray group with a diffraction angle less than the negative first-order diffraction angle. Therefore, the virtual image $V_0$ is observed only over the range from the position where the negative first-order diffracted light is projected to the position where the first-order diffracted light is projected. Also, the virtual image $V_0$ is bright near the zero-order diffraction direction and is dark near the periphery.

If the lens fits into the range indicated by P for the pitch of the hologram illustrated in FIG. 3, the size of the hologram, and the lens diameter and arrangement, then only display light beams having an angle of the negative first-order diffraction angle or greater to the positive first-order diffraction angle or less reach the retina. Here, the range indicated by P is referred to as the eye plane P. In the present disclosure, the size of the eye plane P is set to be an area that is approximately the size of a human pupil or somewhat larger than a pupil. By irradiation with illumination light, a light ray group passes through the eye plane P from the area where the hologram of the spatial light modulator is formed and forms a desired image on the retina. This light ray group is referred to as the "regular light ray group that forms the display light beam wavefront" or simply the "regular light ray group."

Figure 4:
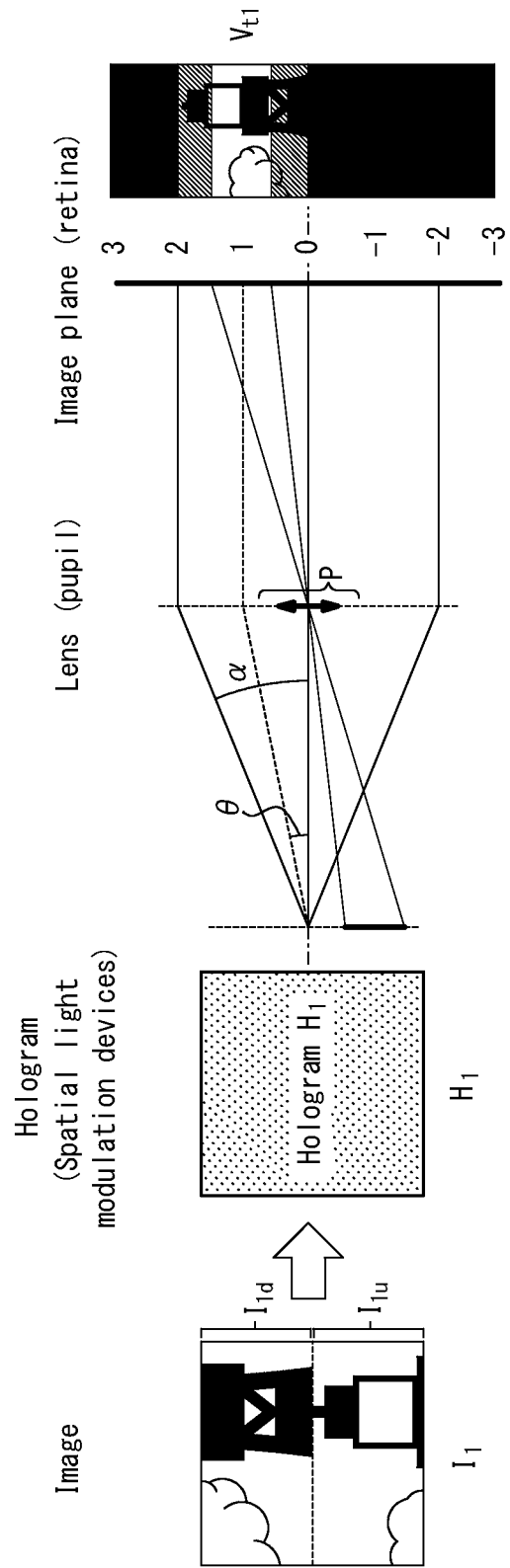
FIG. 4 illustrates image display by a hologram based on the image in FIG. 2 after adjusting the size and direction relative to a human pupil.

Next, FIG. 4 illustrates a hologram image display of the same image as in FIG. 2 after adjusting the size and direction relative to a human pupil. In this case as well, the hologram $H_1$ is restricted in size by the narrow eye plane P as in FIG. 3 and is positioned and arranged so that the lower image $I_{1d}$ of the hologram $H_1$ reaches the image plane as a regular light ray group with a diffraction angle of the zero-order diffraction angle or greater to the first-order diffraction angle or less, and so that the upper image $I_{1u}$ reaches the image plane as a regular light ray group with a diffraction angle of greater than the first-order diffraction angle to the second-order diffraction angle or less. Therefore, as illustrated in FIG. 4, the hologram $H_1$ is shifted downwards from the position at which a perpendicular from the center of the lens (pupil) intersects the light modulation area of the spatial light modulator. As a result, from the center of the image plane upwards, the upper image $I_{1u}$ and the lower image $I_{1d}$ of the original image $I_1$ are formed in the state before vertical switching. Accordingly, the observer can observe the virtual image $V_{t1}$ of the original image with the lower image $I_{1d}$ arranged below the upper image $I_{1u}$. The virtual image $V_{t1}$ is bright near the direction of first-order diffracted light and is dark near the periphery.

Figure 5:
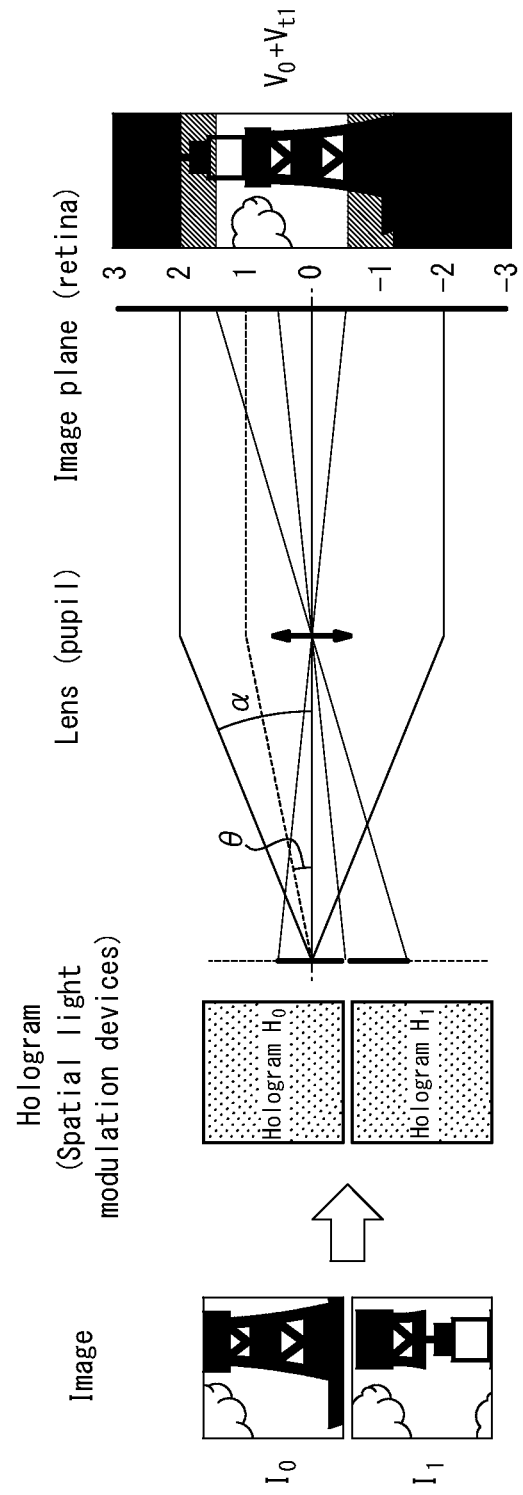
FIG. 5 illustrates image display by combining the holograms in FIG. 3 and FIG. 4.

FIG. 5 illustrates image display by combining the holograms in FIG. 3 and FIG. 4 and illustrates the basic principle behind the present disclosure. On the same light modulation area, the hologram $H_0$ of FIG. 3 and the hologram $H_1$ of FIG. 4 are arranged alongside one another at the positions at which these holograms were arranged in FIG. 3 and FIG. 4. As a result, the regular light ray groups passing through the lens form partially overlapping images on the image plane. Accordingly, the observer can observe an image in which the virtual image $V_0$ of FIG. 3 is overlaid on the virtual image $V_{t1}$ of FIG. 4. In this case, the angle of view of the virtual image that the observer observes is wider than the case of displaying the hologram $H_0$ or the hologram $H_{t1}$ alone. In other words, with the method of image display in FIG. 5, the angle of view is expanded beyond the range of the diffraction angle of the negative first-order diffraction angle or greater to the first-order diffraction angle or less. The present disclosure uses this principle to allow hologram image display such that the display angle of view is expanded to a range of a high-order diffraction angle greater than the ±first-order diffraction angle.

Figure 6:
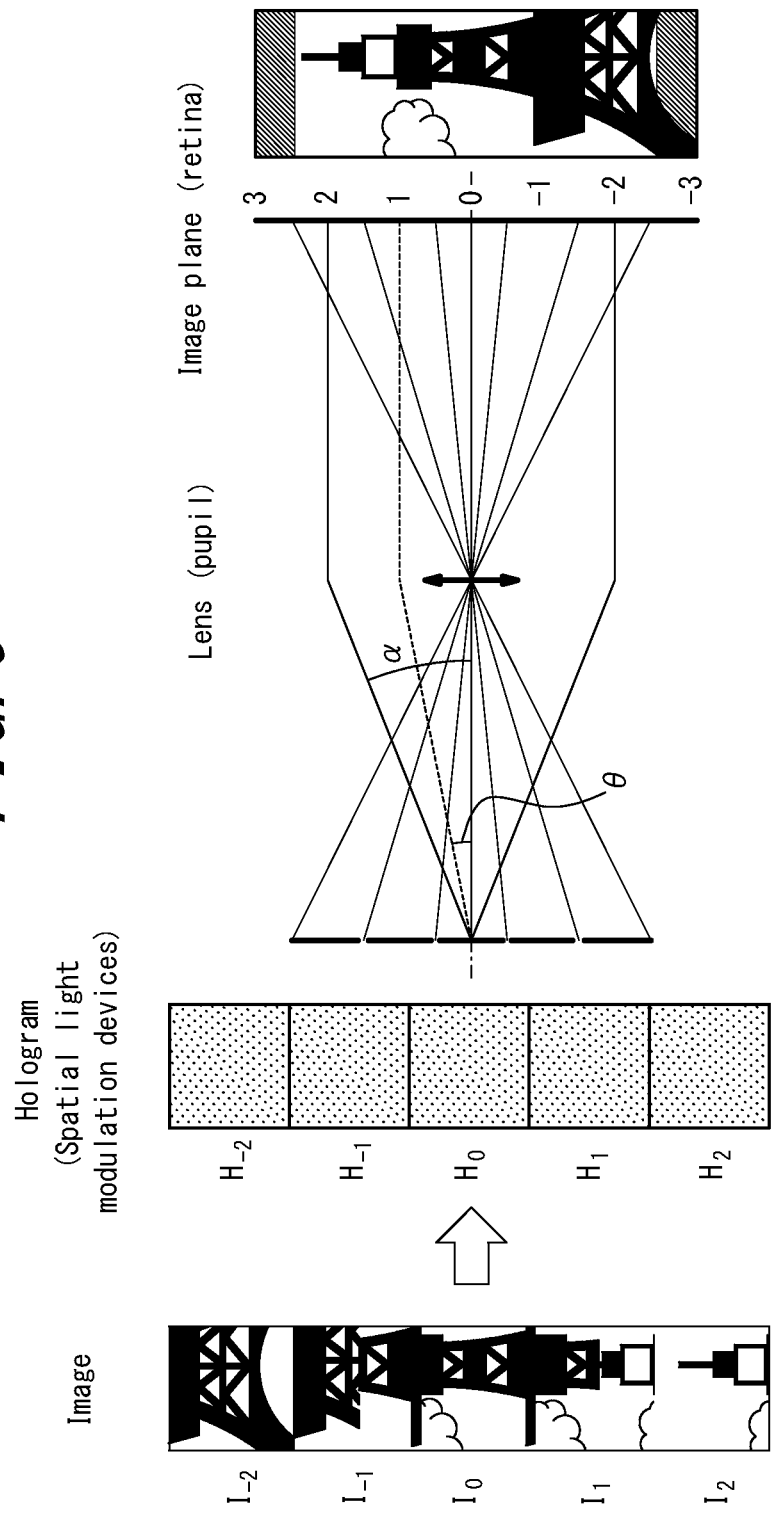
FIG. 6 illustrates an example of a hologram in which an expanded display angle of view according to the present disclosure is arranged in a one-dimensional direction.

FIG. 6 illustrates an example of a hologram in which an expanded display angle of view according to the present disclosure is arranged in a one-dimensional direction. In FIG. 6, the original image I is further divided in a one-dimensional direction into images $I_{-2}$ to $I_2$. One half of each of the original images $I_{-2}$ to $I_2$ overlaps the adjacent image. Furthermore, like $I_1$ in FIG. 2, and $I_1$ and $I_{-1}$ are divided into upper and lower portions that are switched. From these original images $I_{-2}$ to $I_2$, holograms $H_{-2}$ to $H_2$ are generated. For the generated holograms $H_{-2}$ to $H_2$, the size and the direction relative to the lens are adjusted so that only light beams in the range of the diffraction angle corresponding to the target order pass through the lens. As a result, among the light beams from the illumination light beams modulated by the holograms and emitted, light beams passing through the observer's pupil become a regular light ray group, form a display light beam wavefront, and form a vertically combined image on the observer's retina. Accordingly, the observer can observe a virtual image in which the angle of view is vertically expanded. In this way, by using diffracted light with a diffraction angle having an absolute value greater than the range of the ±first-order diffraction angle, which conventionally has not been used, the present disclosure allows display of an image with a large angle of view.

Figure 7:
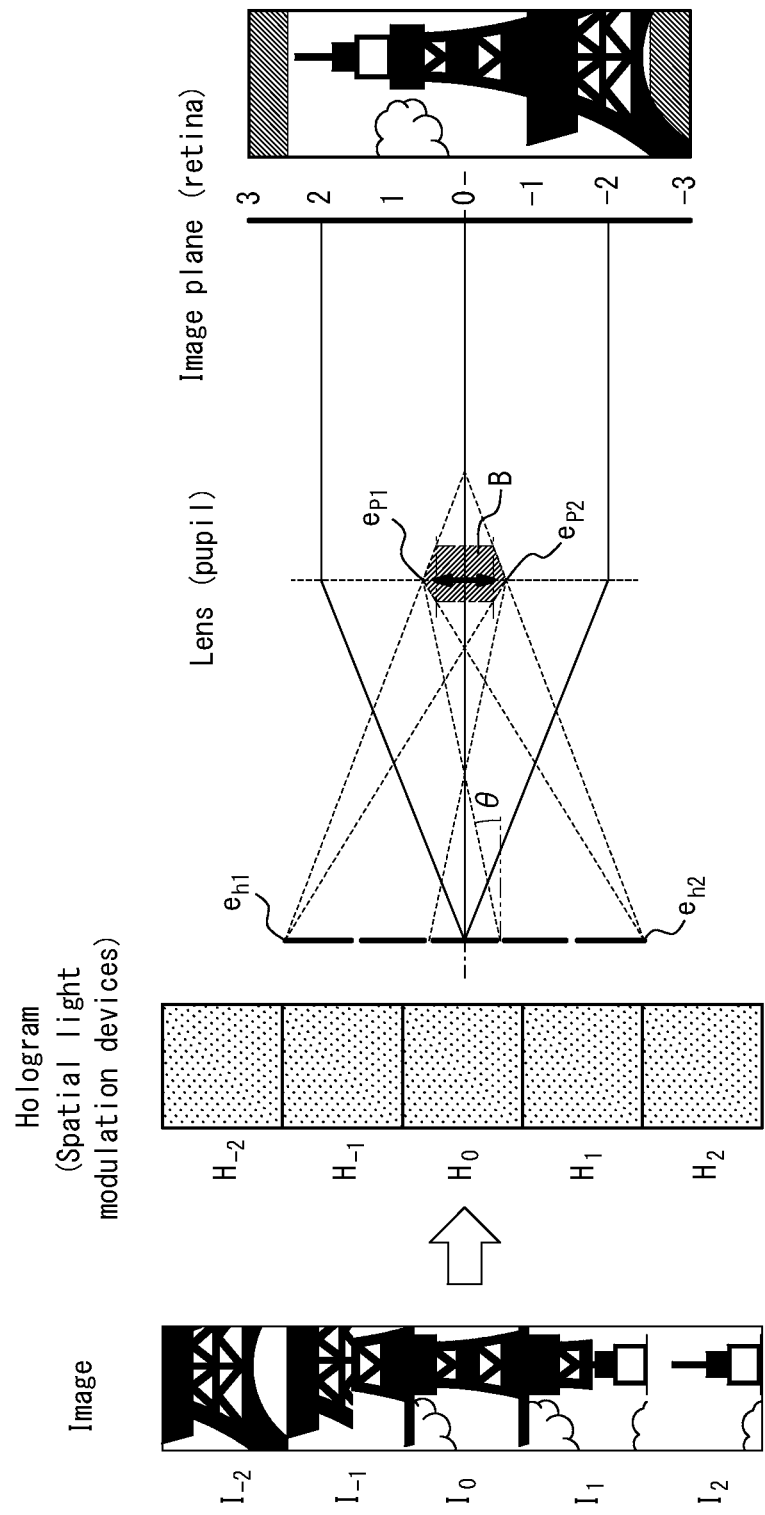
FIG. 7 illustrates the eye box in FIG. 6.

FIG. 7 illustrates the eye box in FIG. 6. As viewed in a direction orthogonal to the hologram plane, the eye plane, and the image plane, the eye box B in this disclosure is within a range of six points represented by the intersections between four lines that connect the edges $e_{p1}$, $e_{p2}$ of the eye plane and the edges $e_{h1}$, $e_{h2}$ of the holograms with two lines that, with the eye plane at the center, are parallel to a normal line to the eye plane and are separated by an interval equivalent to the lens diameter indicated in FIG. 7 by the double-headed arrow. When the lens fits into the range of these six points, unwanted light beams do not reach the retina, and all areas of the hologram image can be observed.

Next, a specific embodiment of the present disclosure is described with reference to the drawings.

Figure 8:
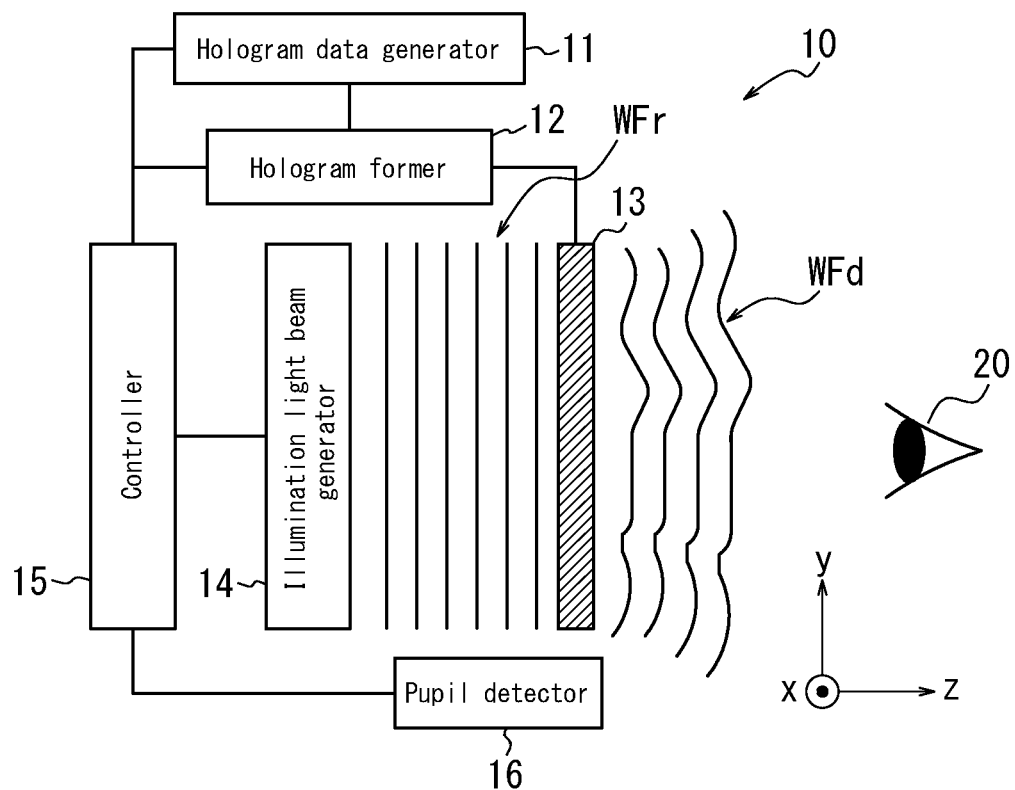
FIG. 8 schematically illustrates the configuration of a hologram image display apparatus according to an embodiment of the present disclosure.

FIG. 8 schematically illustrates the configuration of a hologram image display apparatus according to an embodiment of the present disclosure. As indicated by the eye 20 of the observer, the hologram image display apparatus 10 is for observation of an image by the observer to the right of the figure. The hologram image display apparatus 10 is configured to include a hologram data generator 11, a hologram former 12, a phase modulator 13 (spatial light modulator), an illumination light beam generator 14, and a controller 15 (spatial light modulator controller). The directions that are in the plane of the light modulation area of the phase modulator 13 and orthogonal to each other are defined as the x-direction and the y-direction, and the direction orthogonal to the x-direction and the y-direction and towards the observer from the phase modulator 13 is defined as the z-direction.

The hologram data generator 11 receives input of an image to be displayed and generates hologram data corresponding to the modulation amount of each coordinate in the phase modulator 13. Hologram data can be generated using the Gerchberg-Saxton (GS) algorithm, which is known in the field of computer-generated holograms. Instead of being input from an external source, the image to be displayed may be generated by a computer including a hologram data generator. The image to be displayed may also be 2D image data or may be data on a three-dimensional object. The hologram data generator 11 may be implemented as a functional block of a computer having a high-performance CPU, as a dedicated hologram computer, as an LSI for hologram computation, or the like.

The hologram former 12 writes and rewrites a 2D distribution of a phase modulation amount (also referred to below as a "hologram pattern") to be formed on the light modulation area of the phase modulator 13 in accordance with the hologram data generated by the hologram data generator 11. The hologram former 12 can control the modulation amount individually for each phase modulation device of the phase modulator 13.

The phase modulator 13 (spatial light modulator) has a light modulation area formed by a plurality of phase modulation devices (light modulation devices) arranged in a two-dimensional array. The phase modulator 13 modulates the spatial phase distribution of the optical wavefront of transmitted light beams. The phase modulator 13 is connected electrically to and is driven by the hologram former 12. A transmissive liquid crystal display (LCD) or the like that performs phase modulation using liquid crystals may be used as the phase modulator 13. Hereinafter, the observer side (eye 20 side) of the phase modulator 13 is referred to as the "front side," and the opposite side, i.e. the illumination light beam generator 14 side, is referred to as the "back side."

The illumination light beam generator 14 is configured to include a surface light source that emits an illumination light beam wavefront WFr that is a plane wave with high spatial coherence. The illumination light beam generator 14 is positioned on the back side of the light modulation area of the phase modulator 13 and irradiates the illumination light beam to be incident on the light modulation area of the phase modulator 13 perpendicularly. Accordingly, the optical system from the illumination light beam generator 14 to the back side of the phase modulator 13 constitutes an illumination optical system. By this irradiation of the illumination light beam, the illumination light beam wavefront WFr is modulated, forming the display light beam wavefront WFd that would be formed if the image to be displayed existed on the back side of the phase modulator 13. In other words, the phase modulator 13 converts the illumination light beam wavefront WFr by diffraction to the display light beam wavefront WFd.

The controller 15 controls the hologram image display apparatus 10 overall. The controller 15 may be implemented by, for example, a computer CPU, memory, programs stored in the memory, and the like. The controller 15 may also be implemented by the same hardware as the hologram data generator 11 and the hologram former 12. The controller 15 is electrically connected to each of the hologram data generator 11, the hologram former 12, and the illumination light beam generator 14. Based on the hologram data generated by the hologram data generator 11, the controller 15 drives the hologram former 12 and writes and rewrites a hologram pattern on the light modulation area of the phase modulator 13. In conjunction with the writing and rewriting of hologram patterns in the phase modulator 13, the controller 15 drives the illumination light beam generator 14 to cause the illumination light beam generator 14 to emit illumination light beams.

The hologram image display apparatus 10 may be provided with a pupil detector 16 (pupil position detection mechanism) connected to the controller 15. The pupil detector 16 is configured to include a sensor that detects the pupil position of the observer three dimensionally. For example, the observer may be photographed with two CCD cameras, the pupil may be detected by image processing, and 3D coordinates of the pupil position may be calculated based on a triangulation method. Based on the output from the pupil detector 16, the controller 15 can calculate the position of the pupil of the observer's eye 20 relative to the phase modulator 13.

Figure 9:
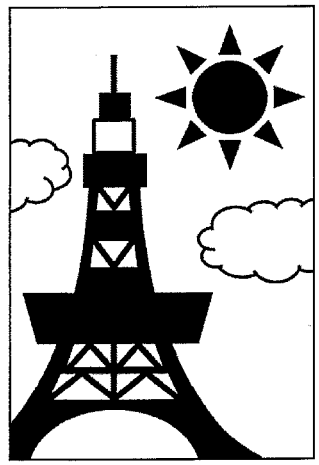
FIG. 9 illustrates an example of the original image to be displayed.

Next, taking the original image in FIG. 9 as an example, the procedure for displaying a hologram image is described. In FIG. 9, the horizontal direction (the direction along a "row" in the following explanation) corresponds to the x-direction of the light modulation area of the phase modulator 13, and the vertical direction (the direction along a "column" in the following explanation) corresponds to the y-direction of the light modulation area of the phase modulator 13.

Figure 10:
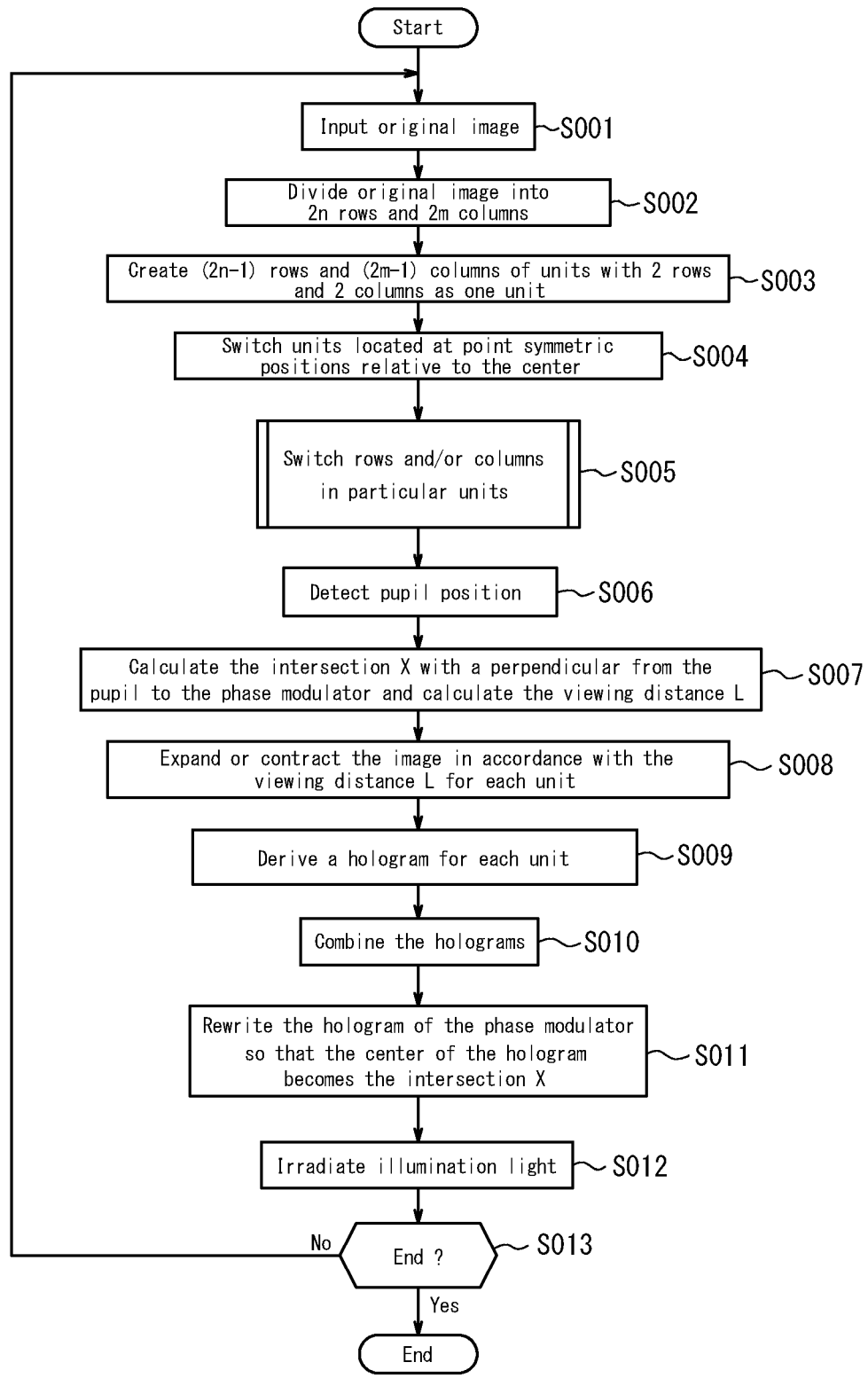
FIG. 10 is a flowchart illustrating the procedure to display a hologram image from the original image.

FIG. 10 is a flowchart illustrating the procedure to display a hologram image from the original image. First, the original image of FIG. 9 that is to be displayed is input into the hologram image display apparatus 10 (step S001). The data for the original image are transferred to the hologram data generator 11, and as described below, hologram data are generated from the original image.

Figures 11, 12:
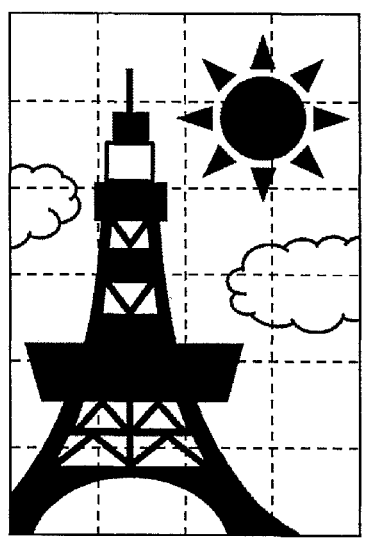
FIG. 11 illustrates an example of dividing the original image.
FIG. 12 illustrates the original image along with division boundaries.

First, in the hologram data generator 11, the original image is divided into 2n rows and 2m columns (n, m are positive integers) (step S002). FIG. 11 illustrates the method for dividing the original image. In this division, the original image is divided into six rows and four columns. Accordingly, n=3 and m=2. The combination of n and m is not limited to 3 and 2, and a variety of combinations are possible. The minimum area divided in FIG. 11 is referred to below as a "divided area." To identify each divided area, a label ($k_m$, $k_n$) corresponding to the column and row is assigned. Here, $k_n$ is defined as $k_n$=n, n−1, . . . , 1, −1, . . . , −(n−1), −n from the top to the bottom of the original image (in the example in this embodiment, 3, 2, 1, −1, −2, −3), and $k_m$ is defined as $k_m$=−m, −(m−1), . . . , −1, 1, . . . , m−1, in from the left to the right of the original image (in the example in this embodiment, −2, −1, 1, 2). FIG. 12 illustrates the original image along with division boundaries. In FIG. 12, the boundaries between divided areas are indicated by dashed lines.

Figures 13, 14:
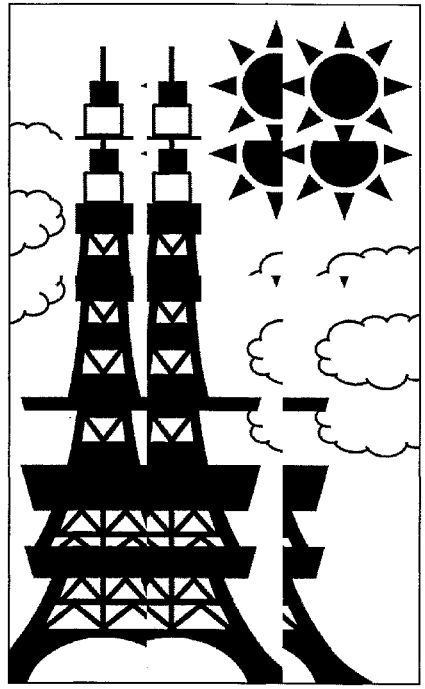
FIG. 13 illustrates a method for generating a first-order image from the original image.
FIG. 14 illustrates a first-order image generated from the original image in FIG. 9.

Next, FIG. 13 illustrates a method for generating a first-order image from the original image. In FIG. 13, two rows by two columns of divided areas that are adjacent in FIG. 11 are taken as one unit (unit area) to generate (2n −1) rows by (2m−1) columns of units (step S003). In greater detail, two rows by two columns of divided areas having the divided area (−2, 3) at the uppermost left in FIG. 11 as the upper left divided area are taken as one unit and placed in the upper left portion of the generated first-order image (see FIG. 13). Next, two rows by two columns of divided areas having the divided area (−1, 3) that is one column to the right in FIG. 11 as the upper left divided area are newly taken as one unit and placed to the right of the previously placed unit. In this way, after reaching the two rows by two columns of divided areas at the right edge in FIG. 11 by shifting one column at a time, next the two rows by two columns of divided areas having the divided area (−2, 2) at the left edge, shifted one row down in FIG. 11, as the upper left divided area are taken as one unit and placed below the left edge of the units that were previously placed in the horizontal direction (the row direction). Similarly, from the original image divided as in FIG. 11, two rows by two columns of divided areas are sequentially extracted, taken as a unit, and placed. In this way, units are extracted so as to include all two row by two column portions of divided areas from the upper left to the lower right in FIG. 11, and the units are placed as illustrated in FIG. 13. In FIG. 13, the boundaries of units are indicated by solid lines, whereas the boundaries of divided areas of the original image included in the units are indicated by dashed lines.

FIG. 14 illustrates a first-order image generated from the original image in FIG. 9. As illustrated in FIG. 13 and FIG. 14, divided images included in the original image are displayed in overlap in the first-order image.

Next, units located at point symmetric positions relative to the center of the first-order image are switched (step S004) to generate a second-order image. First, for the sake of explanation, labels ($j_m$, $j_n$) are assigned to the units in the first-order image, as illustrated in FIG. 15. Here, $j_n$ is defined as $j_n$=n−1, . . . , 1, 0, −1, (n−1) from the top to the bottom (in the example in this embodiment, 2, 1, 0, −1, −2). Also, $j_m$ is defined as $j_m$=−(m−1), . . . , −1, 0, 1, . . . , m−1 from the left to the right (in the example in this embodiment, −1, 0, 1). Next, with unit [0, 0] at the center, units at point symmetric positions to each other are switched. In other words, an operation is performed to switch units [$j_m$, $j_n$] and [−$j_m$, −$j_n$].

Figures 17, 18:
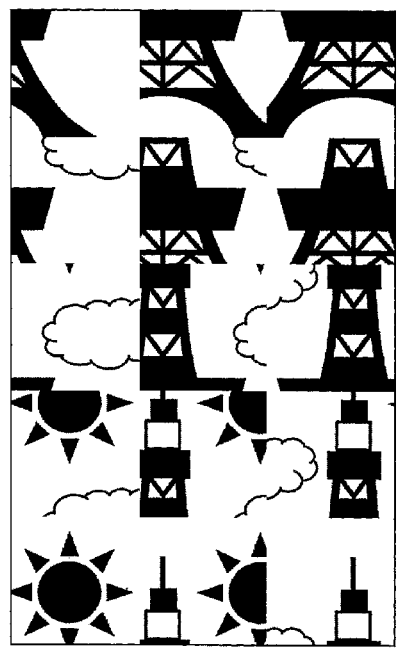
FIG. 17 illustrates the division of the original image corresponding to each of the units of a second-order image.
FIG. 18 illustrates a second-order image generated from the original image in FIG. 9.

FIG. 16 illustrates a method for generating a second-order image from a first-order image. The units labeled [$j_m$, $j_n$] in FIG. 15 are switched as in FIG. 16. During this switching, the positional relationship inside the unit of the divided areas forming the unit does not change. FIG. 17 illustrates the divided areas of the original image corresponding to each of the units of the second-order image. Also, FIG. 18 illustrates the second-order image generated from the original image in FIG. 9.

Figure 19:
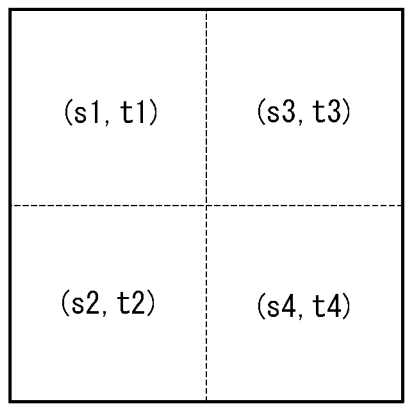
FIG. 19 illustrates the division of units.
Figure 20:
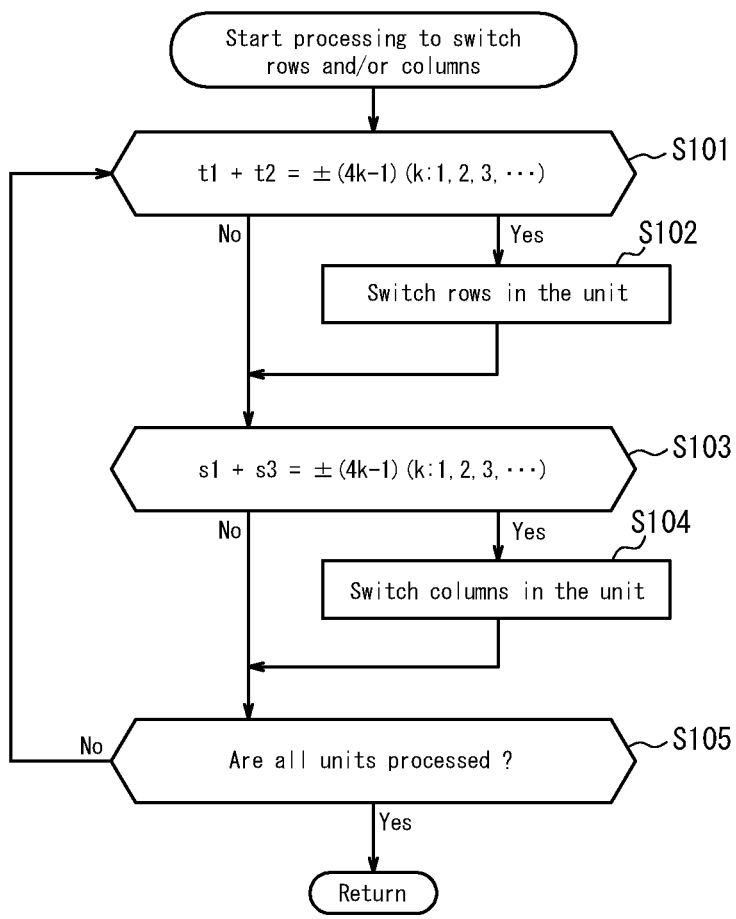
FIG. 20 is a flowchart illustrating the procedure to generate a third-order image from a second-order image.

Next, in a unit satisfying a particular condition, the rows and/or columns of the two rows by two columns of divided areas in the unit are switched (step S005). The unit satisfying a particular condition refers to when, upon projection as a hologram, the regular light ray group forming the display light beam wavefront that displays the image in the unit spreads across the diffraction angle of diffracted light of an odd-numbered order. This procedure is described with reference to FIG. 20 for the case of indicating the divided areas within each unit, as in FIG. 19. By the flowchart in FIG. 20, a third-order image is generated from a second-order image.

For each unit of the second-order image generated in step S004, the hologram data generator 11 determines whether the following equation holds for t1 and t2, which represent different row numbers in the unit (step S101).

$$t1+t2=\pm(4k-1)(k:1,2,3)$$

When this equation holds, the hologram data generator 11 switches the rows in the unit (step S102) and proceeds to step S103. When the equation does not hold, the hologram data generator 11 simply proceeds to step S103.

Next, for each unit of the second-order image generated in step S004, the hologram data generator 11 determines whether the following equation holds for s1 and s3, which represent different column numbers in the unit (step S103).

$$s1+s3=\pm(4k-1)(k:1,2,3)$$

When this equation holds, the hologram data generator 11 switches the columns in the unit (step S104) and proceeds to step S105. When the equation does not hold, the hologram data generator 11 simply proceeds to step S105.

The hologram data generator 11 repeats this process sequentially for all of the units (step S105). Once this processing is complete for all of the units, the hologram data generator 11 terminates this processing and returns to the flowchart of FIG. 10. As a result, a third-order image is generated.

Figure 23:
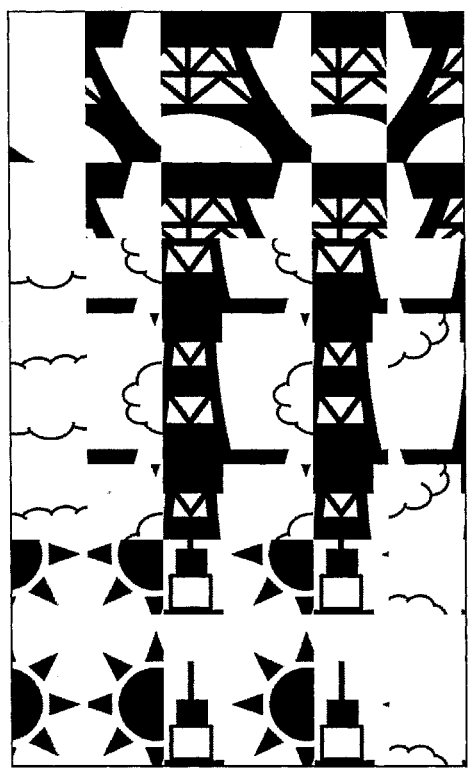
FIG. 23 illustrates a third-order image generated from the original image in FIG. 9.

FIG. 21 illustrates switching the rows and columns during generation of the third-order image. For the second-order image illustrated in FIG. 17, the rows and columns targeted for switching are indicated by double-headed arrows. In FIG. 21, the rows and columns are switched in the units located in rows ±1 and columns ±1. FIG. 22 illustrates the divided areas of each unit in the third-order image. In other words, for each unit after switching of rows and columns, FIG. 22 illustrates the divided areas corresponding to the original image illustrated in FIG. 11. Also, FIG. 23 illustrates the third-order image generated from the original image in FIG. 9. As described above, calculation of the original image through the third-order image can be made without relation to the position of the observer's eye. Accordingly, calculations can be made in advance in the hologram data generator 11 through the third-order image and stored in the hologram image display apparatus 10.

Next, the pupil detector 16 detects the position of the observer's pupil (step S007). The pupil detector 16 acquires position information on the pupil, such as the distance from the pupil detector 16, the direction, and the like. The position information on the observer's pupil detected by the pupil detector 16 is transmitted to the controller 15. The controller 15 defines the point at which the perpendicular from the center of the observer's pupil to the light modulation area of the phase modulator 13 intersects the light modulation area as X, calculates the position of X and the viewing distance L from the pupil to the position X, and transmits the result to the hologram data generator 11.

Next, the hologram data generator 11 calculates the boundary for each unit based on the viewing distance L and expands or contracts the image of each unit of the third-order image (step S008). The expansion or contraction of the image is an adjustment so that only the light beam in the range of the diffraction order corresponding to each unit passes through the pupil.

The length in the column direction (y-direction) of the hologram that displays each image is given by the following equation in areas projecting the diffracted light of a diffraction angle of the negative first-order diffraction angle or greater to the first-order diffraction angle or less.

$$h_{m\_size} = 2L \tan \theta_1 - D \quad (5)$$

In other areas, the length is given by the following equation, where m is the diffraction order with the greatest absolute value in the y-direction among the diffraction orders forming the regular light of the unit.

$$h_{m\_size} = L(\tan \theta_m - \tan \theta_{m-1}) \quad (6)$$

The number of phase modulation devices $h_{m\_num}$ displaying each image can be calculated by the following equation.

$$h_{m\_num} = h_{m\_size}/p \quad (7)$$

Here, θm is the in-order diffraction angle, λ is the wavelength of illumination light, p is the device pitch of the phase modulation devices, L is the viewing distance (distance between the light modulation area of the phase modulator and the pupil), and D is the width of the eye plane P. The length of the hologram and the number of phase modulation devices in the row direction (x-direction) can be calculated similarly.

Figure 24:
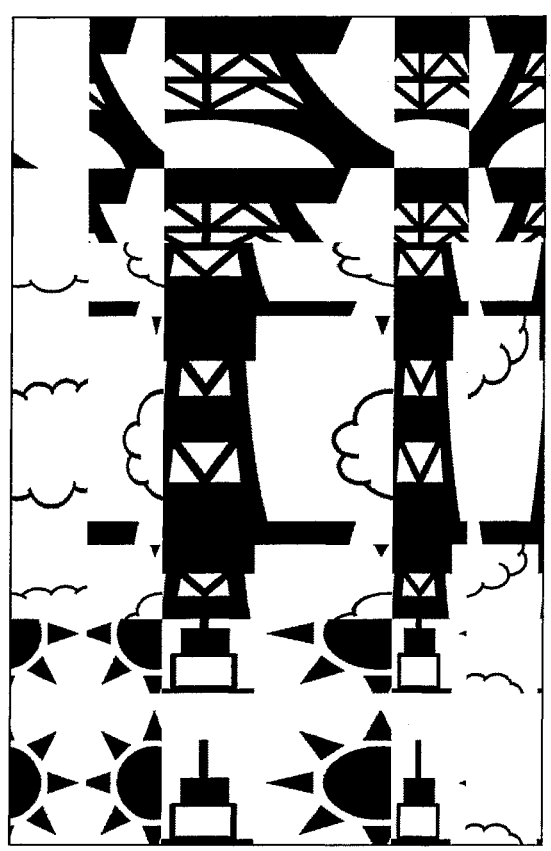
FIG. 24 illustrates a fourth-order image generated from the original image in FIG. 9.
Figure 25:
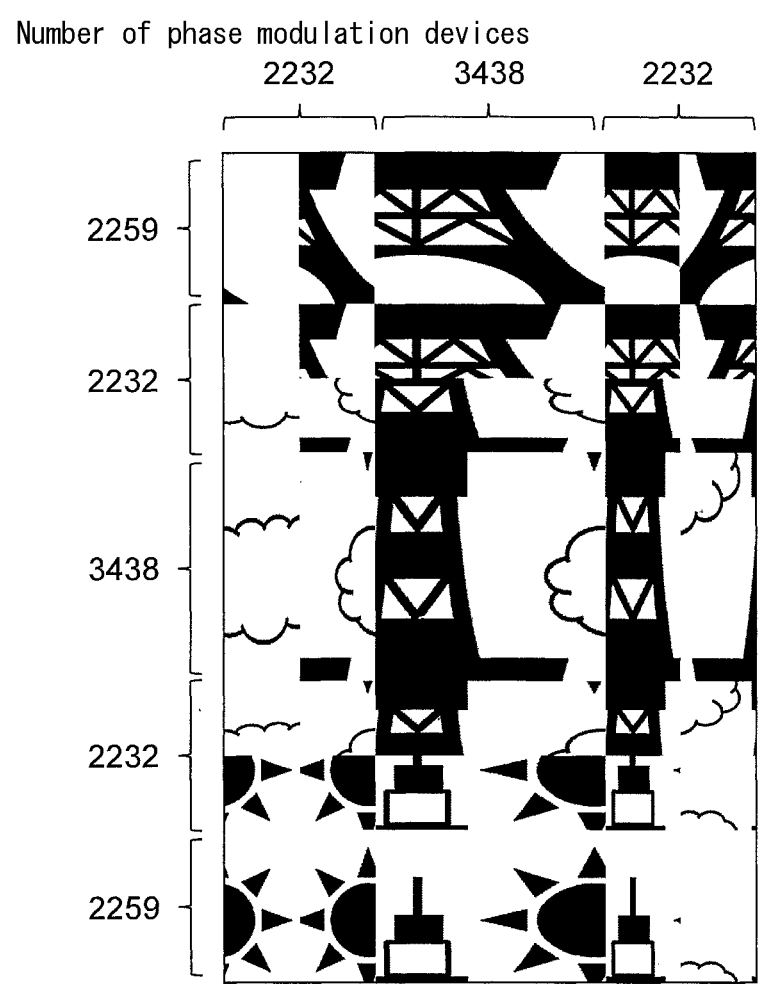
FIG. 25 illustrates the number of pixels allocated to each unit of the fourth-order image in FIG. 24.

FIG. 24 illustrates a fourth-order image generated from the original image in FIG. 9. FIG. 25 illustrates the number of phase modulation devices of the phase modulator for the hologram generated from the image of each unit of the fourth-order image in FIG. 24. When the units of the fourth-order image and the corresponding areas in the hologram pattern on the light modulation area are represented as units $\{j_m, j_n\}$, and each unit is assigned a label by the same method as in FIG. 15, then the number of phase modulation devices in the y-direction of the hologram corresponding to the unit at row zero that includes unit $\{0, 0\}$ is 3428. Similarly, the numbers of phase modulation devices in the y-direction of the hologram corresponding to the units at the ±first rows and ±second rows are respectively 2232 and 2259. The number of phase modulation devices in the x-direction of each unit are also the illustrated values corresponding to the column number of each unit. Note that the number of phase modulation devices is calculated taking the wavelength λ of the light source of the illumination light beam generator 14 to be 532 nm, the viewing distance L to be 300 mm, the phase modulation device pitch p of the phase modulator 13 to be 6 μm, the width of the eye plane to be 6 mm, the horizontal angle of view of the hologram to be ±5.1°, and the perpendicular angle of view to be 7.6°. In these examples illustrated in FIG. 24 and FIG. 25, the units in the central portion of the image are expanded, and the units at the periphery are reduced.

From the image of each unit in the fourth-order image generated in this way, sets of hologram data are derived in the hologram data generator 11 (step S009). For example, when the original image is divided into six rows and four columns as in this example, sets of hologram data are derived from a total of 15 unit images in five rows by three columns. The derived sets of hologram data are combined to be placed at the positions of the corresponding units in the fourth-order image (step S010) to generate one set of hologram data.

Next, the hologram former 12 receives the hologram data from the hologram data generator 11 and obtains position information on the point X from the controller 15. The hologram former 12 then rewrites the hologram pattern of the phase modulator 13 so that the point X becomes the center of the hologram with respect to the phase modulator 13 (step S011). As a result, the positional relationship between the pupil position of the observer (or the eye box) and the hologram is adjusted always to be appropriate.

Figure 26:
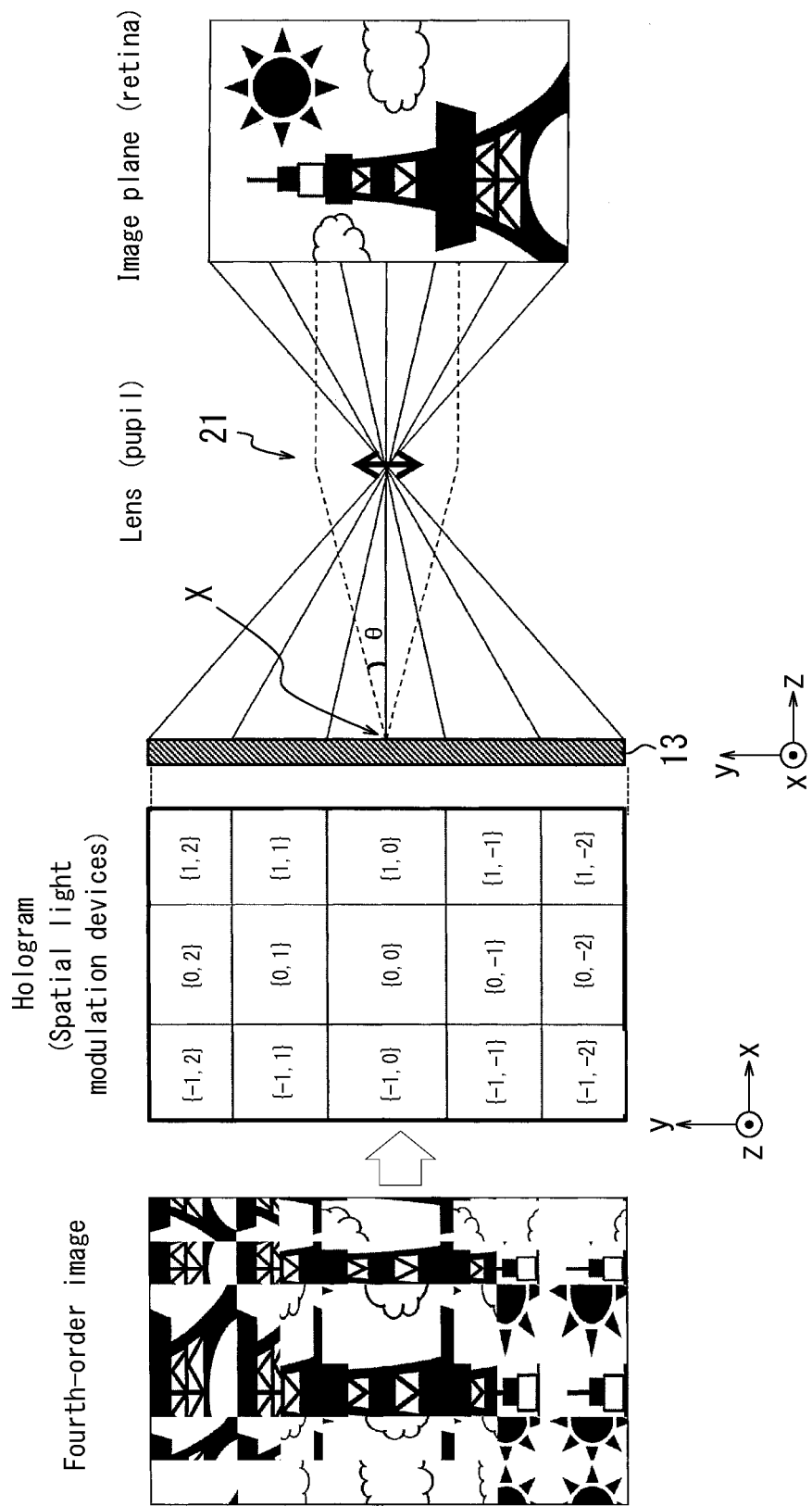
FIG. 26 illustrates display of a hologram by a fourth-order image.

FIG. 26 illustrates display of a hologram by a fourth-order image. FIG. 26 illustrates how sets of hologram data corresponding to the units are generated from the fourth-order image, and based on hologram data yielded by combining these sets of hologram data, a hologram pattern is written on the light modulation area of the phase modulator 13, and an image is projected on the image plane (the observer's retina) through the lens (the observer's pupil 21). In FIG. 26, the light modulation area of the phase modulator 13 is modulated by hologram data constituted by a plurality of units corresponding to the positions of the units in the fourth-order image. Each unit is indicated in FIG. 26 as $\{j_n, j_m\}$ (here, $j_n$=−1, 0, 1, and $j_m$=−2, −1, 0, 1, 2). As already described, the units are divided in the x-direction and the y-direction by the range of the diffraction angle of the regular light ray groups configuring the display light beam wavefront, and ranges of diffraction angles of different orders are allocated so that the range of the diffraction angle of the emitted regular light ray groups is from the negative first-order diffraction angle to the first-order diffraction angle, from the zero-order diffraction angle to the second-order diffraction angle, from the first-order diffraction angle to the third-order diffraction angle, and the like.

In other words, based on the range of the diffraction angles, in the x-direction and the y-direction, of the regular light ray group that configures the display light beam wavefront, the light modulation area is formed by a plurality of units divided in the x-direction and the y-direction, the range of the diffraction angle of the regular light ray group allocated to each of the plurality of units is prescribed to be a range between two diffraction angles of different orders in the x-direction and the y-direction, and the combinations of orders differ from each other.

Furthermore, within the light modulation area, with respect to the unit $\{0, 0\}$ that projects a regular virtual image (first virtual image) with only light of a diffraction angle in a range of the negative first-order diffraction angle or greater to the first-order diffraction angle or less in both the x-direction and the y-direction, the unit $\{1, 0\}$ adjacent in the x-direction is an area that projects a regular virtual image (second virtual image) by diffracted light with a diffraction angle in a range of the zero-order diffraction angle or greater to the first-order diffraction angle or less and diffracted light with a diffraction angle in a range of greater than the first-order diffraction angle to the second-order diffraction angle or less, and this virtual image is divided in two in the x-direction and switched in the x-direction with respect to the image that would be reproduced when projected at a diffraction angle of the negative first-order diffraction angle or greater to the first-order diffraction angle or less. The same also holds for the other unit {−1, 0} that is adjacent to the unit {0, 0} in the x-direction. Also, the unit {0, 1} adjacent in the y-direction to the unit {0, 0} is an area that projects a regular virtual image (third virtual image) by diffracted light with a diffraction angle of the zero-order diffraction angle or greater to the first-order diffraction angle or less and diffracted light with a diffraction angle of greater than the first-order diffraction angle to the second-order diffraction angle or less, and this virtual image is divided in two in the y-direction and switched in the y-direction with respect to the image that would be reproduced when projected at a diffraction angle of the negative first-order diffraction angle or greater to the first-order diffraction angle or less. The same also holds for the other unit {0, −1} that is adjacent to the unit {0, 0} in the y-direction. Between the units {±1, 0} and the adjacent units {0, 0} and {±2, 0}, the corresponding areas of the original image overlap. Between the units {0, ±1} as well and the adjacent units {0, 0} and {0, ±2}, the corresponding areas of the original image overlap. In this way, units that have regions overlapping with units above and below and/or units to the left and right, such as the units {±1, 0} and {0, ±1}, are provided, and images are projected by inverting the images vertically and/or horizontally and overlapping with adjacent units. As a result, the boundary areas of the divided hologram do not grow dark, and a combined virtual image that is uniform and bright can be displayed.

Also, as stated in step S011, based on the result of the pupil detector 16 detecting the position of the pupil 21, the controller 15 positions the center of the light modulation area corresponding to the zero-order unit {0, 0} in both the row direction (x-direction) and the column direction (y-direction) at the position X where a perpendicular from the center of the pupil 21 intersects the plane of the light modulation area of the phase modulator 13. As a result, a display light beam having a diffraction angle of the negative first-order diffraction angle or greater to the first-order diffraction angle or less passes through the pupil 21. The hologram patterns corresponding to other units as well are placed so that display light beams in the desired range of diffraction angles prescribed by the range of diffraction orders pass through the pupil 21. Furthermore, as indicated in step S008, the controller 15 expands or contracts the image for each unit, so that only the light ray group in the desired range of diffraction angles passes through the pupil 21. In other words, the controller 15 controls the spatial light modulator so as to form a spatial area in which, from each unit, only a regular light ray group emitted in a range of diffraction angles allocated to the unit exists, i.e. a spatial area in which a hologram is displayed near the observer's pupil 21 (in other words, an eye box).

In this way, the observer can observe the original image illustrated in FIG. 9 as a virtual image with the hologram display apparatus illustrated in FIG. 8.

As described above, according to this embodiment, with the phase modulator, a hologram is generated by dividing the image to be displayed into a plurality of units corresponding to different diffraction orders, and a display light beam wavefront is formed by modulating an illumination light beam wavefront so that a regular light ray group configuring the display light beam wavefront becomes a light ray group with a diffraction angle having an absolute value of greater than the ±first-order diffraction angle and a light ray group having an absolute value with a diffraction angle of the ±first-order diffraction angle or less by the spatial light modulator. Therefore, the display angle of view can be expanded to the range of a high-order diffraction angle greater than the first-order diffraction angle.

Since the fourth-order image includes the original image in overlap, the border portions of the image in the divided units are displayed in overlap. Hence, the image does not become dark, thus yielding an image that is bright overall. Furthermore, the observer's pupil position is detected by the pupil detector, and the center of the hologram pattern that is formed is positioned. Therefore, even if the position of the observer's eye changes, the hologram can continue to be displayed so as to be visible by the observer by shifting the position of the hologram pattern on the light modulation area in conjunction with the change in the position of the eye.

The present disclosure is not limited to the above embodiments, and a variety of changes and modifications may be made. For example, the method of dividing the original image is not limited to six rows by four columns, and a variety of divisions are possible. The spatial light modulator is not limited to a spatial light phase modulator, and a variety of devices may be adopted, such as a spatial light intensity modulator that modulates the amplitude of the optical wavefront of the light beam, a device that can modulate both the phase distribution and the intensity distribution, and the like. Furthermore, the illumination light beam wavefront emitted by the illumination optical system is not limited to a plane wave. Other wavefronts, such as a spherical wave, may be used. In this case, the hologram data generator calculates hologram data in accordance with the illumination light beam wavefront that is used. Also, the original image that is displayed is not limited to a still image and may be a moving image. Furthermore, while a pupil detector is provided in the present disclosure, a pupil detector need not be provided when the relative positions of the hologram image display apparatus and the observer's eye can be fixed.

The invention claimed is:

1. A hologram image display apparatus comprising:
an illumination optical system configured to emit an illumination light beam wavefront; and
a spatial light modulator having a light modulation area that converts the illumination light beam wavefront by diffraction to a display light beam wavefront and displays a virtual image;
wherein the spatial light modulator forms the display light beam wavefront by modulating the illumination light beam wavefront so that at least a portion of a regular light ray group configuring the display light beam wavefront is a light ray group with a diffraction angle having an absolute value greater than a ±first-order diffraction angle by the spatial light modulator, and another portion of the regular light ray group is a light ray group with a diffraction angle having an absolute value of a ±first-order diffraction angle or less by the spatial light modulator;
wherein one direction in the light modulation area of the spatial light modulator is an x-direction and another direction intersecting the x-direction is a y-direction, and based on a range of diffraction angles, in the x-direction and the y-direction, of the regular light ray group configuring the display light beam wavefront, the light modulation area is formed by a plurality of unit areas divided in the x-direction and the y-direction, a range of the diffraction angle of the regular light ray group allocated to each of the plurality of unit areas is prescribed to be a range between two diffraction angles of different orders in the x-direction and the y-direction, and combinations of the orders differ from each other; and wherein within the light modulation area, a unit area that projects a regular first virtual image with only light of a diffraction angle in a range of a negative first-order diffraction angle or greater to a first-order diffraction angle or less in both the x-direction and the y-direction is a {0, 0} area, a unit area adjacent to the {0, 0} area in the x-direction is an area that projects a regular second virtual image by diffracted light of a zero-order diffraction angle or greater to the first-order diffraction angle or less and light with a diffraction angle in a range of greater than the first-order diffraction angle to a second-order diffraction angle or less, the second virtual image is divided in two in the x-direction and switched in the x-direction with respect to an image that would be reproduced when projected at a diffraction angle in a range of the negative first-order diffraction angle or greater to a first-order diffraction angle or less, a unit area adjacent to the {0, 0} area in the y-direction is an area that projects a regular third virtual image by diffracted light of the zero-order diffraction angle or greater to the first-order diffraction angle or less and diffracted light of greater than the first-order diffraction angle to the second-order diffraction angle or less, and the third virtual image is divided in two in the y-direction and switched in the y-direction with respect to an image that would be reproduced when projected at a diffraction angle in a range of the negative first-order diffraction angle or greater to the first-order diffraction angle or less.

2. The hologram image display apparatus of claim 1, wherein an $m^{th}$-order diffraction angle is represented by $$\theta_m = \arcsin(m \times \lambda / 2p)$$

where $\lambda$ is a wavelength of the illumination light beam, p is a device pitch of the spatial light modulator, and m is an order of diffraction.

3. The hologram image display apparatus of claim 1, further comprising a spatial light modulator controller configured to control the spatial light modulator so as to form a spatial area in which, from each unit area, only the regular light ray group emitted in a range of the diffraction angles allocated to the unit area exists.

4. The hologram image display apparatus of claim 1, further comprising a pupil position detection mechanism configured to detect a pupil position of an eyeball of an observer three-dimensionally, a hologram image being formed on a retina of the eyeball;
wherein the hologram image display apparatus calculates boundaries of the unit areas of the spatial light modulator in conjunction with the pupil position and calculates hologram data for each unit area for an image to be reproduced, and the spatial light modulator forms the display light beam wavefront based on the hologram data.

5. A hologram image display apparatus comprising:
an illumination optical system configured to emit an illumination light beam wavefront; and
a spatial light modulator having a light modulation area that converts the illumination light beam wavefront by diffraction to a display light beam wavefront and displays a virtual image;
wherein the spatial light modulator forms the display light beam wavefront by modulating the illumination light beam wavefront so that at least a portion of a regular light ray group configuring the display light beam wavefront is a light ray group with a diffraction angle having an absolute value greater than a ±first-order diffraction angle by the spatial light modulator, and another portion of the regular light ray group is a light ray group with a diffraction angle having an absolute value of a ±first-order diffraction angle or less by the spatial light modulator;

wherein one direction in the light modulation area of the spatial light modulator is an x-direction and another direction intersecting the x-direction is a y-direction, and based on a range of diffraction angles, in the x-direction and the y-direction, of the regular light ray group configuring the display light beam wavefront, the light modulation area is formed by a plurality of unit areas divided in the x-direction and the y-direction, a range of the diffraction angle of the regular light ray group allocated to each of the plurality of unit areas is prescribed to be a range between two diffraction angles of different orders in the x-direction and the y-direction, and combinations of the orders differ from each other;

wherein the hologram image display apparatus further comprises a spatial light modulator controller configured to control the spatial light modulator so as to form a spatial area in which, from each unit area, only the regular light ray group emitted in a range of the diffraction angles allocated to the unit area exists; and wherein within the light modulation area, a unit area that projects a regular first virtual image with only light of a diffraction angle in a range of a negative first-order diffraction angle or greater to a first-order diffraction angle or less in both the x-direction and the y-direction is a {0, 0} area, a unit area adjacent to the {0, 0} area in the x-direction is an area that projects a regular second virtual image by diffracted light of a zero-order diffraction angle or greater to the first-order diffraction angle or less and light with a diffraction angle in a range of greater than the first-order diffraction angle to a second-order diffraction angle or less, the second virtual image is divided in two in the x-direction and switched in the x-direction with respect to an image that would be reproduced when projected at a diffraction angle in a range of the negative first-order diffraction angle or greater to a first-order diffraction angle or less, a unit area adjacent to the {0, 0} area in the y-direction is an area that projects a regular third virtual image by diffracted light of the zero-order diffraction angle or greater to the first-order diffraction angle or less and diffracted light of greater than the first-order diffraction angle to the second-order diffraction angle or less, and the third virtual image is divided in two in the y-direction and switched in the y-direction with respect to an image that would be reproduced when projected at a diffraction angle in a range of the negative first-order diffraction angle or greater to the first-order diffraction angle or less.

6. The hologram image display apparatus of claim 5, wherein an $m^{th}$-order diffraction angle is represented by $$\theta_m = \arcsin(m \times \lambda / 2p)$$

where $\lambda$ is a wavelength of the illumination light beam, p is a device pitch of the spatial light modulator, and m is an order of diffraction.

7. A hologram image display apparatus comprising:
an illumination optical system configured to emit an illumination light beam wavefront; and a spatial light modulator having a light modulation area that converts the illumination light beam wavefront by diffraction to a display light beam wavefront and displays a virtual image;

wherein the spatial light modulator forms the display light beam wavefront by modulating the illumination light beam wavefront so that at least a portion of a regular light ray group configuring the display light beam wavefront is a light ray group with a diffraction angle having an absolute value greater than a ±first-order diffraction angle by the spatial light modulator, and another portion of the regular light ray group is a light ray group with a diffraction angle having an absolute value of a ±first-order diffraction angle or less by the spatial light modulator;

wherein one direction in the light modulation area of the spatial light modulator is an x-direction and another direction intersecting the x-direction is a y-direction, and based on a range of diffraction angles, in the x-direction and the y-direction, of the regular light ray group configuring the display light beam wavefront, the light modulation area is formed by a plurality of unit areas divided in the x-direction and the y-direction, a range of the diffraction angle of the regular light ray group allocated to each of the plurality of unit areas is prescribed to be a range between two diffraction angles of different orders in the x-direction and the y-direction, and combinations of the orders differ from each other;

wherein the hologram display apparatus further comprises a pupil position detection mechanism configured to detect a pupil position of an eyeball of an observer three-dimensionally, a hologram image being formed on a retina of the eyeball; and wherein the hologram image display apparatus calculates boundaries of the unit areas of the spatial light modulator in conjunction with the pupil position and calculates hologram data for each unit area for an image to be reproduced, and the spatial light modulator forms the display light beam wavefront based on the hologram data.

8. The hologram image display apparatus of claim 7, wherein an $m^{th}$-order diffraction angle is represented by $$\theta_m = \arcsin(m \times \lambda / 2p)$$

where $\lambda$ is a wavelength of the illumination light beam, p is a device pitch of the spatial light modulator, and m is an order of diffraction.

9. The hologram image display apparatus of claim 7, further comprising a spatial light modulator controller configured to control the spatial light modulator so as to form a spatial area in which, from each unit area, only the regular light ray group emitted in a range of the diffraction angles allocated to the unit area exists.

10. A hologram image display apparatus comprising:
an illumination optical system configured to emit an illumination light beam wavefront; and a spatial light modulator having a light modulation area that converts the illumination light beam wavefront by diffraction to a display light beam wavefront and displays a virtual image;

wherein the spatial light modulator forms the display light beam wavefront by modulating the illumination light beam wavefront so that at least a portion of a regular light ray group configuring the display light beam wavefront is a light ray group with a diffraction angle having an absolute value greater than a ±first-order diffraction angle by the spatial light modulator, and another portion of the regular light ray group is a light ray group with a diffraction angle having an absolute value of a ±first-order diffraction angle or less by the spatial light modulator;

wherein one direction in the light modulation area of the spatial light modulator is an x-direction and another direction intersecting the x-direction is a y-direction, and based on a range of diffraction angles, in the x-direction and the y-direction, of the regular light ray group configuring the display light beam wavefront, the light modulation area is formed by a plurality of unit areas divided in the x-direction and the y-direction, a range of the diffraction angle of the regular light ray group allocated to each of the plurality of unit areas is prescribed to be a range between two diffraction angles of different orders in the x-direction and the y-direction, and combinations of the orders differ from each other;

wherein the hologram image display apparatus further comprises:
a spatial light modulator controller configured to control the spatial light modulator so as to form a spatial area in which, from each unit area, only the regular light ray group emitted in a range of the diffraction angles allocated to the unit area exists; and
a pupil position detection mechanism configured to detect a pupil position of an eyeball of an observer three-dimensionally, a hologram image being formed on a retina of the eyeball; and wherein the hologram image display apparatus calculates boundaries of the unit areas of the spatial light modulator in conjunction with the pupil position and calculates hologram data for each unit area for an image to be reproduced, and the spatial light modulator forms the display light beam wavefront based on the hologram data.

11. The hologram image display apparatus of claim 10, wherein an $m^{th}$-order diffraction angle is represented by $$\theta_m = \arcsin(m \times \lambda / 2p)$$

where $\lambda$ is a wavelength of the illumination light beam, p is a device pitch of the spatial light modulator, and m is an order of diffraction.

* * * * *